E. E. BUNN & E. O. ROBINSON.
CARBURETER.
APPLICATION FILED AUG. 11, 1913.
1,107,489.
Patented Aug. 18, 1914.
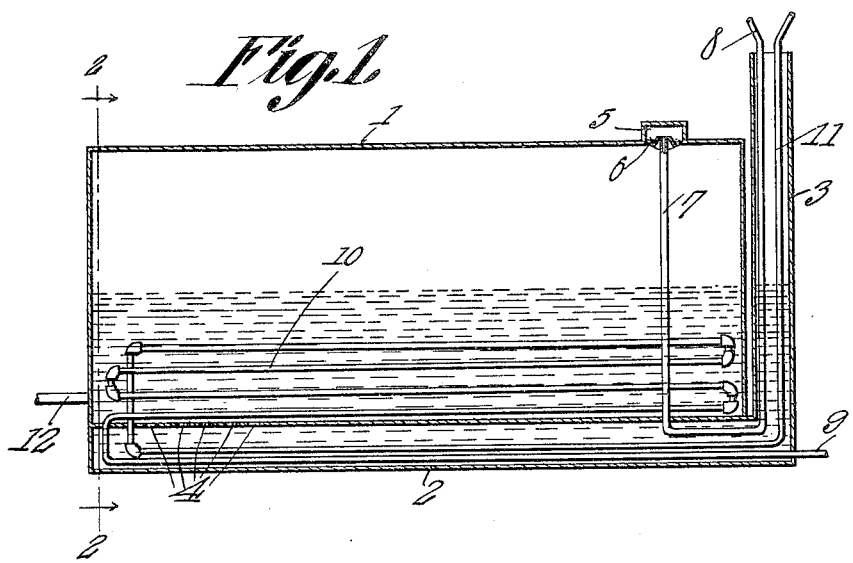
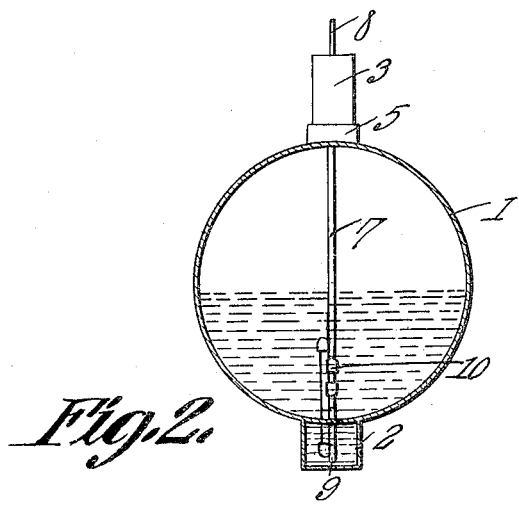
Witnesses
Everett E. Bunn and
Elmer O. Robinson, Inventors
by C. A. Snow & Co.
Attorneys

UNITED STATES PATENT OFFICE.

EVERETT E. BUNN AND ELMER O. ROBINSON, OF HARRISONVILLE, MISSOURI.

CARBURETER.

1,107,489.      Specification of Letters Patent.      Patented Aug. 18, 1914.

Application filed August 11, 1913. Serial No. 784,168.

*To all whom it may concern:*

Be it known that we, EVERETT E. BUNN and ELMER O. ROBINSON, citizens of the United States, residing at Harrisonville, in the county of Cass, State of Missouri, have invented a new and useful Carbureter, of which the following is a specification.

The present invention relates to improvements in carbureters, one object of the invention being the provision of a carbureter for supplying carbureted air to an explosion engine, and which utilizes the heat from the exhaust gases of the explosion engine for hastening or facilitating the carburation of the liquid fuel, the carbureter being constructed to be disposed between the fuel tank and the explosion engine and provided with means whereby the proper proportion of air is supplied to the fuel to produce the desired proportion in the carbureted air.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a longitudinal sectional view through the complete carbureter. Fig. 2 is a section taken on line 2—2 of Fig. 1.

Referring to the drawings, the numeral 1 designates the main tank of the carbureter, which in this instance is a cylindrical tank disposed in a horizontal position and having connected to the under side thereof, and extending longitudinally the full length and beyond one end of the tank 1, an auxiliary tank 2, which is provided with the flue or stack 3, extending at right angles to one end of the auxiliary tank 2 and above the upper surface of the tank 1. The upper end of the flue 3 constitutes an inlet for the air for mixture with the liquid fuel within the tank 1, which is maintained at a predetermined level by any desired means and as is customary by a float actuated valve mechanism. The bottom of the tank 1 adjacent the auxiliary tank 2 is perforated as at 4, so as to permit of the proper introduction of the air drawn in through the inlet end of the flue 3 and into the auxiliary tank 2 where the air is thoroughly mixed with the fuel and passes upwardly through the body of the fuel into the tank 1 and is directed through the head or dome portion 5 of the tank 1 into the screened inlet 6 of the carbureted air conveying pipe 7. This pipe 7 extends downwardly through the bottom of the tank 1 and upwardly and exteriorly through the flue 3 to the manifold (not shown) of an explosion engine. Thus the explosion engine creates the necessary suction to draw air through the inlet of the flue 3 for proper mixture with the fluel within the auxiliary tank 2 and the main tank 1.

In order to facilitate the vaporization of the liquid fuel within the auxiliary tank 2 and also the main tank 1, a conduit 9 is led from the exhaust manifold (not shown) of the explosion engine, and in through the auxiliary tank 2 to the coils 10 which are disposed within the tank 1, the outlet branch 11 being projected upwardly through the flue 3 and to the outside air. By this means the exhaust gases from the explosion engine will properly heat the liquid fuel within the auxiliary tank 2 and the main tank 1 and as its outlet 11 passes through the upper end of the flue 3, the entering air will also be heated by contact with the heated conduit 11. By this means the air entering the liquid fuel within the flue 3, as illustrated in Fig. 1, will be heated and will thus when drawn through the fuel into the tank 1 and finally out of the pipe 8 hasten the evaporation of the fuel so that a better mixture of carbureted air will be delivered to the explosion engine.

From the foregoing description, it is evident that a carbureter of this character may be readily used in connection with stationary explosion engines, and also in connection with explosion engines used for automobile and marine purposes, the amount of air admitted being regulated entirely by the action of the engine itself, the space above the liquid fuel within the tank 1 constituting a reservoir to collect and retain a certain proportion of carbureted air so that at the initial starting of the explosion engine, it will be impossible to draw therewithin any of the liquid fuel, only a carbureted air. A pipe 12 is led into the tank 1 for supplying the liquid fuel to the tank and as before stated, any means for maintaining the desired level within the tank 1 may be employed.

What is claimed is:

1. A carbureter, including a main tank, an auxiliary tank adjacent the bottom thereof, the main tank being provided with a plurality of perforations through the bottom and in communication with the auxiliary tank, an air admitting flue in communication with one end of the auxiliary tank, a fuel supplying conduit in communication with the main tank, a carbureted air conveying conduit in communication with the upper portion of the main tank and extending through the air admitting flue, and a heating coil disposed within the main tank, one of the terminals thereof entering the auxiliary tank while the other terminal thereof is disposed within the air flue.

2. A carbureter, including a horizontally disposed cylindrical main tank, an auxiliary tank adjacent the bottom thereof and provided with an upstanding air admitting flue, the upper end of which extends above the main tank, the bottom of the main tank adjacent the auxiliary tank being provided with perforations to form a communicating means between the auxiliary and main tanks, a U-shaped conduit having one terminal terminating within the main tank above the fuel level thereof and the opposite terminal extending through and exteriorly of the air admitting flue, and constituting the carbureted air outlet conduit, and a heating coil disposed within the main tank and having one terminal extending through the auxiliary tank while the other terminal extends through the air flue.

In testimony that we claim the foregoing as our own, we have hereto affixed our signatures in the presence of two witnesses.

EVERETT E. BUNN.
ELMER O. ROBINSON.

Witnesses:
 NOLAN BRICKEN,
 A. L. WEBBER.

Copies of this patent may be obtained for five cents each, by addressing the "Commissioner of Patents, Washington, D. C."